United States Patent
Zhang et al.

(10) Patent No.: US 6,883,164 B2
(45) Date of Patent: Apr. 19, 2005

(54) STRATEGY FOR DYNAMICALLY MODELING ASN.1 DATA TO AN OBJECT MODEL

(75) Inventors: Xiaoyan Zhang, Austin, TX (US); Randy Scott Humphrey, Austin, TX (US); Theodore Jack London Shrader, Austin, TX (US); Davis Kent Soper, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 09/738,246

(22) Filed: Dec. 15, 2000

(65) Prior Publication Data

US 2002/0129331 A1 Sep. 12, 2002

(51) Int. Cl.⁷ .................................................. G06F 9/45
(52) U.S. Cl. ...................................................... 717/136
(58) Field of Search ................................. 717/136, 137, 717/104–108; 707/103; 704/1

(56) References Cited

U.S. PATENT DOCUMENTS

| | | | |
|---|---|---|---|
| 4,949,253 A | * 8/1990 | Chigira et al. | 717/107 |
| 4,994,998 A | * 2/1991 | Anezaki | 704/1 |
| 5,291,583 A | * 3/1994 | Bapat | 717/137 |
| 5,317,742 A | 5/1994 | Bapat | 707/3 |
| 5,418,963 A | 5/1995 | Anezaki et al. | 717/117 |
| 5,864,862 A | * 1/1999 | Kriens et al. | 707/103 R |
| 5,870,749 A | 2/1999 | Adusumilli | 707/101 |
| 5,983,233 A | 11/1999 | Potonniee | 707/103 |
| 6,052,526 A | 4/2000 | Chatt | 717/136 |
| 6,427,153 B1 | * 7/2002 | Nelson et al. | 707/103 R |

FOREIGN PATENT DOCUMENTS

| | | | |
|---|---|---|---|
| EP | 0 727 739 | 8/1996 | G06F/9/44 |
| WO | WO 99/42916 | 8/1999 | |

OTHER PUBLICATIONS

R. G. Lavender, D.G. Kafura, and R.W. Mullins, Programming with ASN.1 Using Polymorphic Types and Type Specialization, IFIP'94 International Conference on Upper Layer Protocols, Architectures, and Applications.*
Lee, Jae–Oh, *Translation of GDMO/ASN.1 to Java Objects for Network Management*, 1998 IEEE Internation Conference on Communications, vol. 2 of 3, Atlanta, Georgia, pp. 1140–1144.
Li, P.Y.; Liu, J.R.; Li, H.T.; *Object–Oriented Construction of Classes for Communication Protocol*, International Journal of Mini and Microcomputers, vol. 15, No. 2, pp. 90–94.

* cited by examiner

*Primary Examiner*—Todd Ingberg
*Assistant Examiner*—Trent Roche
(74) *Attorney, Agent, or Firm*—Duke W. Yee; Jeffrey S. LaBaw; Stephen J. Walder, Jr.

(57) ABSTRACT

A method, program and system for mapping ASN.1 data to an object model are provided. The invention consists of identifying the start of a data stream and then generating a new object name for the data. Next, the data is parsed to get the identifier and the data length. Then the data's tag type is analyzed. If the tag type is simple, a class diagram is generated for the data and then the source code for the data is generated. If the tag type is not simple, a subroutine is called to further parse the data before generating the class diagram and source code.

23 Claims, 4 Drawing Sheets

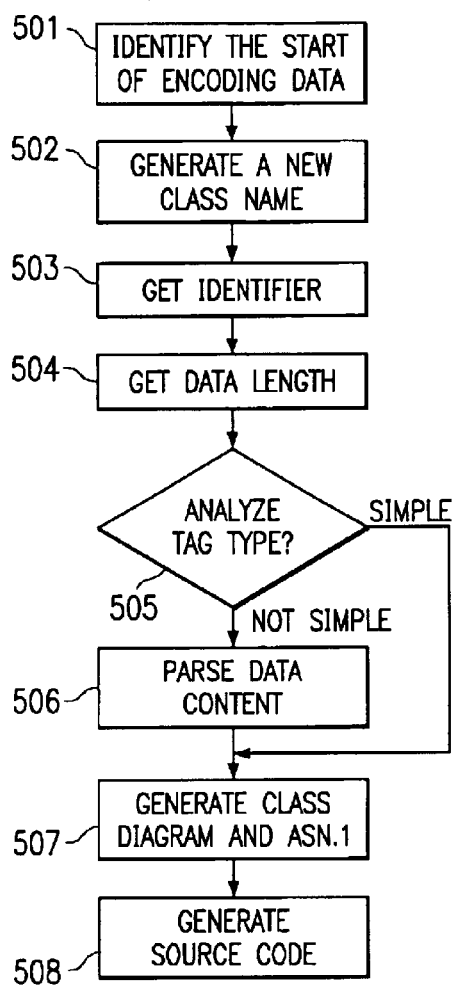
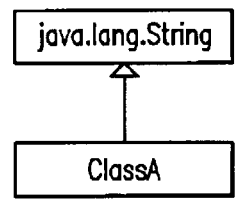
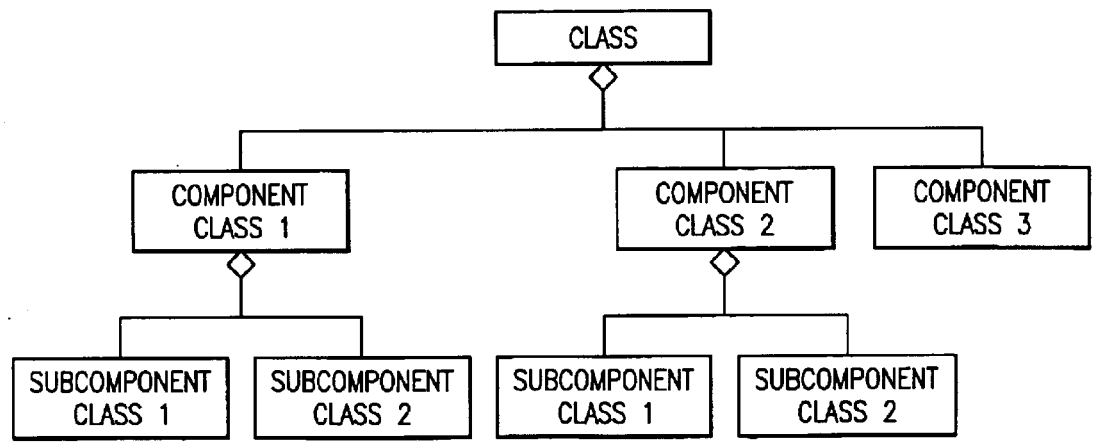

STRATEGY FOR DYNAMICALLY MODELING ASN.1 DATA TO AN OBJECT MODEL

BACKGROUND OF THE INVENTION

1. Technical Field

The present invention relates in general to computer software development. More specifically, the present invention relates to methods for dynamically mapping ASN.1 encoded data to an object model to generate an ASN.1 data structure.

2. Description of Related Art

Abstract Syntax Notation 1 (ASN.1) is an international standard that defines abstract data and message formats for inter-operability. Though initially used for describing email messages within the Open Systems Interconnection environment, ASN.1 has since then been adopted by a wide range of other applications, as in network management, security, mobile (cellular) telephony, air traffic control, and voice and video over the Internet. Examples include X.509 certificates, Public Key Cryptography Standard, Kerberos, Generic Security Service API, and Certificate Management Protocol.

An ASN.1 data type is built up from primitive data types (i.e. INTEGER, REAL, BOOLEAN, and NULL) using three main construction mechanisms: repetition (SEQUENCE OF and SET OF), alternatives (CHOICE), and lists of fields (SEQUENCE and SET). Once an ASN.1 data type has been defined, it can be used in the definition of other ASN.1 data types exactly as if it were a primitive data type. Such data types can be defined before use or after (forward references). Such a recursively-defined data structure could grow to be very complicated, especially with the requirement of the encoding ASN.1 descriptions into Distinguished Encoding Rules (DER) encoding byte arrays, and decoding them. DER is a standard encoding rule used to encode the structure of ASN.1 data to be transferred between the Application Layer and the Presentation Layer of the Open Systems Interconnection (OSI). It provides a means whereby the Presentation Layer can reliably exchange any arbitrary data structure with other computer systems, while the Application Layer can map the encoded data into any type of representation or language that is appropriate for the end user.

Today, object-oriented design and programming has been adopted by more and more enterprises because of its many advantages, such as reusability and ease of maintenance. Java, is one example of an object-oriented, platform-independent, and secure language that has transformed from emerging technology to become one of the dominant languages for successful and secure e-business applications.

Therefore, it would be desirable to have a tool that can map ASN.1 encoded data to an object model and translate ASN.1 encoded data to native Java source code, in order to help enterprises efficiently develop or migrate to object-oriented, cross-platform applications.

SUMMARY OF THE INVENTION

The present invention provides a method, program and system for mapping ASN.1 data to an object model. The invention consists of identifying the start of a data stream and then generating a new object name for the data. Next, the data is parsed to get the identifier and the data length. Then the data's tag type is analyzed. If the tag type is simple, a class diagram is generated for the data and then the source code for the data is generated. If the tag type is not simple, a subroutine is called to further parse the data before generating the class diagram and source code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flowchart illustrating a routine to analyze data streams and create classes and ASN.1 data types in accordance with the present invention;

FIG. 7 depicts an output class diagram in accordance with the present invention.

FIG. 8 depicts an object diagram illustrating a parsing routine's execution order in accordance with the present invention.

DETAILED DESCRIPTION OF THE PREFERRED EMBODIMENT

Figure 1:
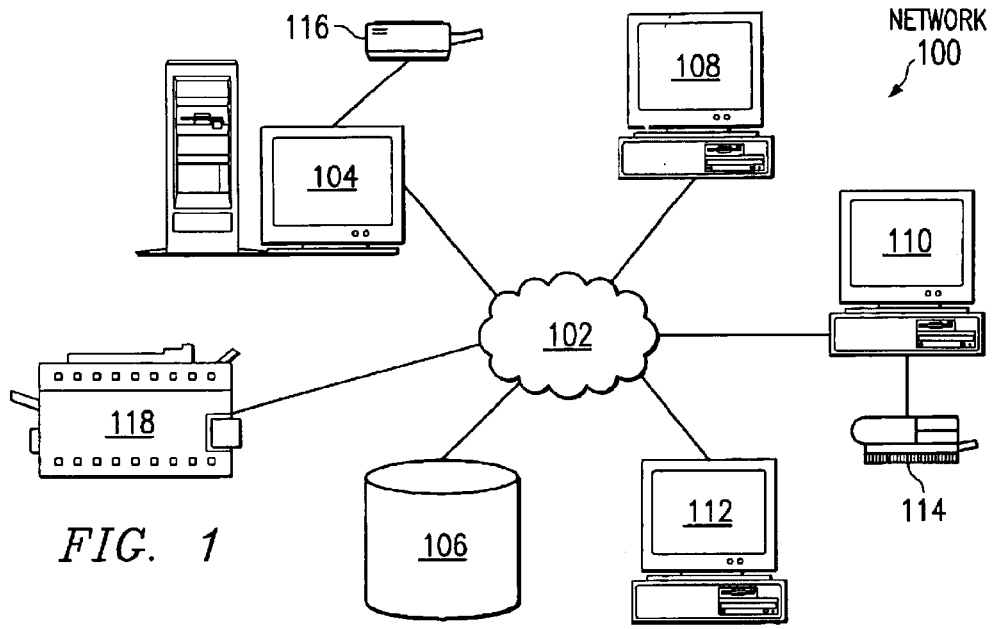
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
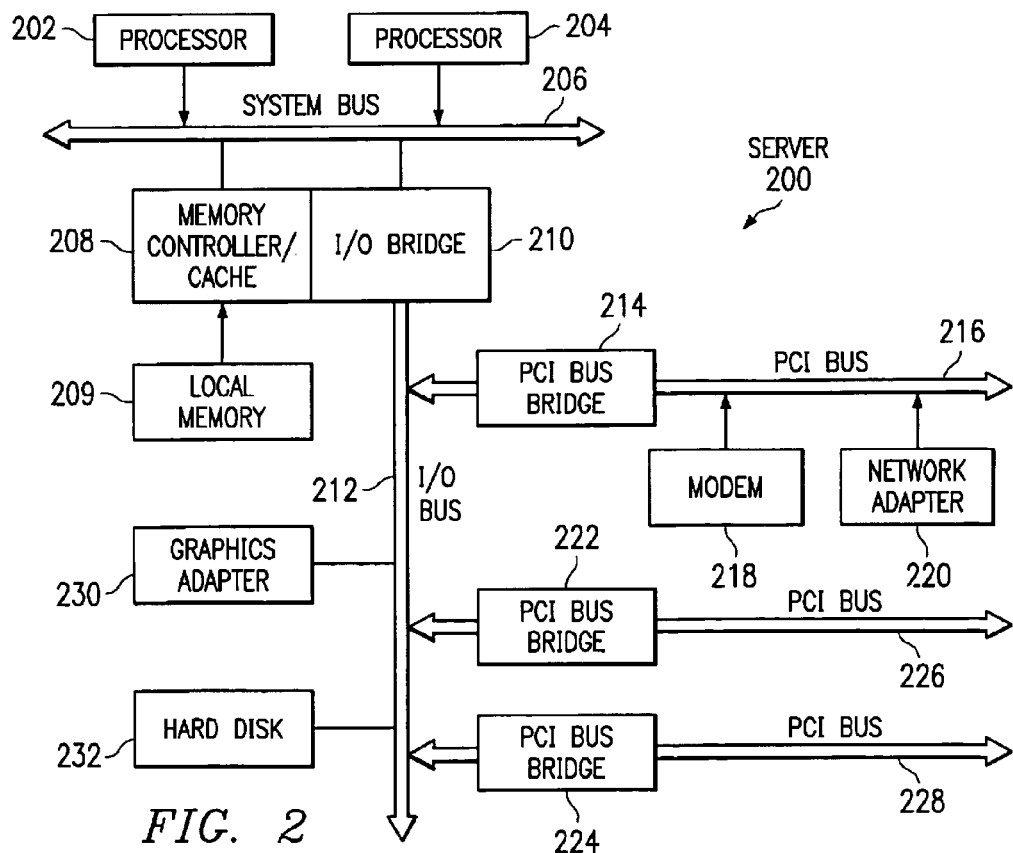
FIG. 2 depicts a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
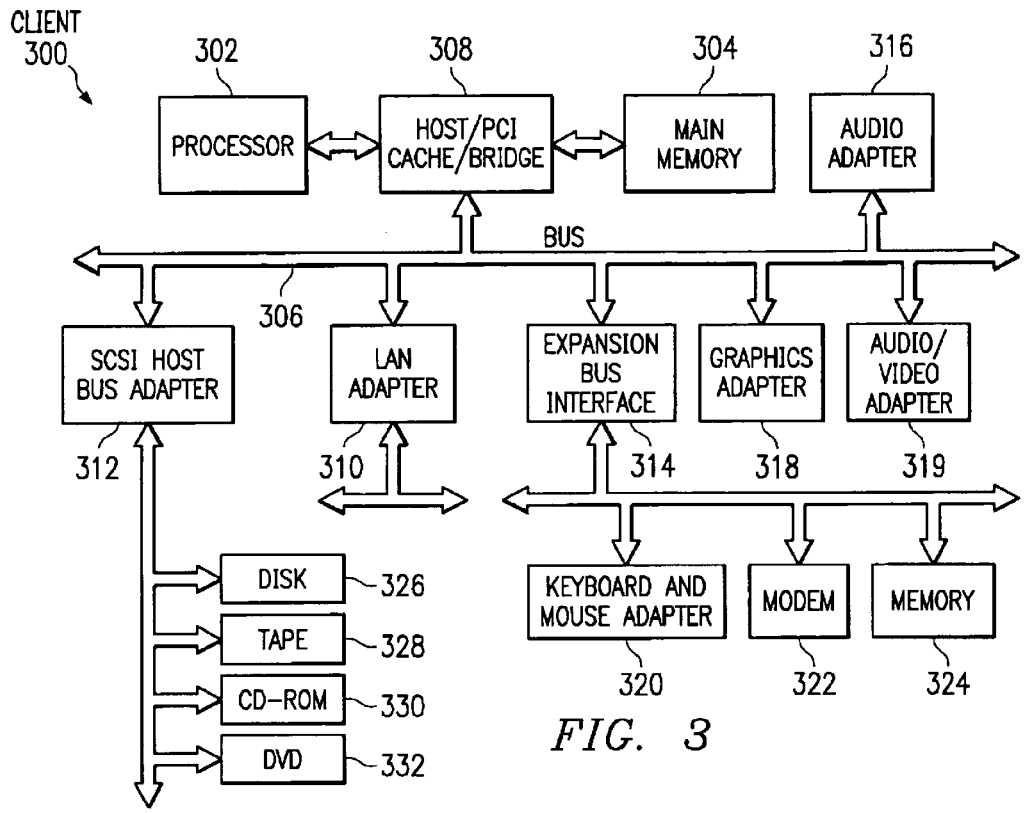
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention translates ASN.1 data to an object model, then generates the source code, displaying each attribute value in a graphical user interface (GUI). The ASN.1 data can be a piece of encoded data, a binary file, a text file written with ASN.1 notation, or just the ASN.1 notations which are entered from an input device. A GUI can be implemented on JavaBean and packaged in a Java Archive (JAR) file that runs in Beanbox or can plug into Java development environments.

An example of input data is illustrated in Table 1, which contains a piece of a binary encoding data stream displayed in hexdecimal format.

TABLE 1

| | | | | |
|---|---|---|---|---|
| 00000000: | 3081CD02 | 01010201 | 003081C5 | 302D0201 |
| 00000010: | 01041841 | 5A4E5F50 | 45524D49 | 4E464F5F |

TABLE 1-continued

| 00000020: | 41554449 | 544C4556 | 454C0030 | 0E300C02 |
|---|---|---|---|---|
| 00000030: | 01010201 | 02040400 | 00000030 | 2B020101 |
| 00000040: | 0416415A | 4E5F5045 | 524D494E | 474F5F51 |
| 00000050: | 4F505F55 | 494E5400 | 300E300C | 02010102 |
| 00000060: | 01020404 | 00000000 | 302E0201 | 01041941 |
| 00000070: | 5A4E5F55 | 45524D49 | 4E464F5F | 5741524E |
| 00000080: | 494E474D | 4F444500 | 300E300C | 02010102 |
| 00000090: | 01020404 | 00000000 | 30370201 | 01042241 |
| 000000A0: | 5A4E5F50 | 45524D49 | 4E464F5F | 5741524E |
| 000000B0: | 494E474D | 4F444550 | 45524D49 | 54544544 |
| 000000C0: | 00300E30 | 0C020101 | 02010204 | 04000000 |

The ASN.1 data types generated from the data stream shown in Table 1 are shown below:

ClassA ::=Sequence {
   attribute1 INTEGER,
   attribute2 INTEGER,
   attribute3 OCTETSTRING
}
ClassB ::=SEQUENCEOF {
   attribute1 ClassA
}
ClassC ::=SEQUENCE {
   attribute1 INTEGER,
   attribute2 OCTETSTRING,
   attribute3 ClassB
}
ClassD ::=SEQUENCEOF {
   ClassC
}
ClassE ::=SEQUENCE {
   attribute1 INTEGER,
   attribute2 INTEGER,
   attribute3 ClassD
}

Figure 4:
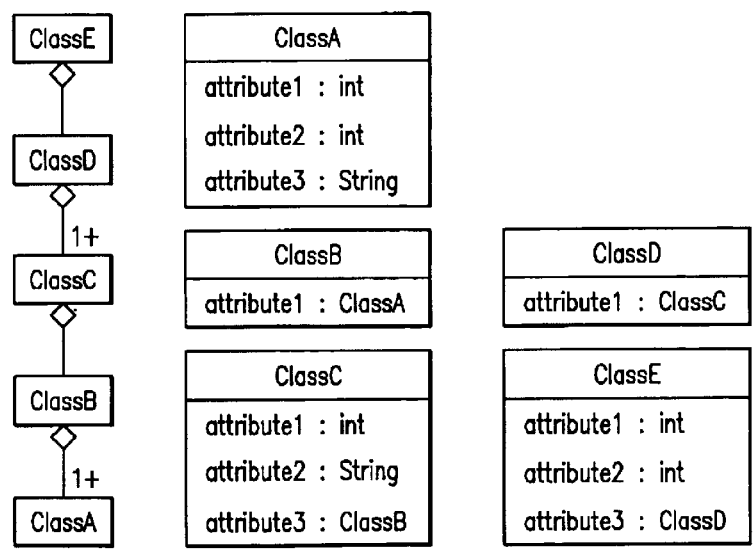
FIG. 4 depicts object diagrams generated from the ASN.1 data types in accordance with the present invention.

Referring now to FIG. 4, object diagrams generated from the ASN.1 data types illustrated above are depicted in accordance with the present invention. The object diagrams in FIG. 4 follow the new Object Modeling Technique (OMT) notation. A diamond link represents an aggregation relationship, in which a class is composed of multiple classes. The object model is displayed with a square box representing a class object. The name of the class, attributes and methods are listed in the box, and the relationships of classes are indicated with links. Each class has a property sheet, and for binary input, this sheet lists the value of each object in it.

Referring to FIG. 5, a flowchart illustrating a routine to analyze data streams and create classes and ASN.1 data types is depicted in accordance with the present invention. DER data is used as an example. However, this procedure is suitable for a Basic Encoding Rules (BER) data stream too. BER or DER encoding data has three parts: identifier octets, which identify ASN.1 value tag type; length octets, which give the number of bytes as data content; and content octets, which are the real data.

The routine begins by using DER rules to identify the start of encoding data (step 501). Encoding data starts from identifier octets. Usually it is at the start of the input byte stream or binary file, but it does not have to be. Next, a new object name is generated, which usually is a class name (step 502). The object name could be a general name such as "ClassA" or "ObjectA" for convenient naming. The routine then parses one or more bytes of data to get the identifier (step 503). At this point, anywhere from one up to 127 bytes of data are parsed to get the data length (step 504). The BER rules are followed to parse data in steps 503 and 504.

Having obtained the identifier and data length, the next step is to identify what kind of tag type the data has (step 505). If the tag type is simple, a class diagram and ASN.1 notation are generated (step 507). Simple data are tagged with simple encoding types such as INTEGER, GENERAL STRING, OCTET STRING, etc. In this case, the class is constructed by extending the superclass that the encoding type corresponds to. For example, INTEGER corresponds to java.lang.Integer class in the Java 2 standard edition API. GENERAL STRING corresponds to java.lang.String class, OCTET STRING corresponds to java.lang.Byte class. An example of an output class diagram is illustrated in FIG. 7, and the ASN.1 notation is: ClassA ::=GeneralString. The final step is to generate the source code of the data (step 508).

If the tag type is not simple, a subroutine is called to parse data content (step 506).

Figure 6:
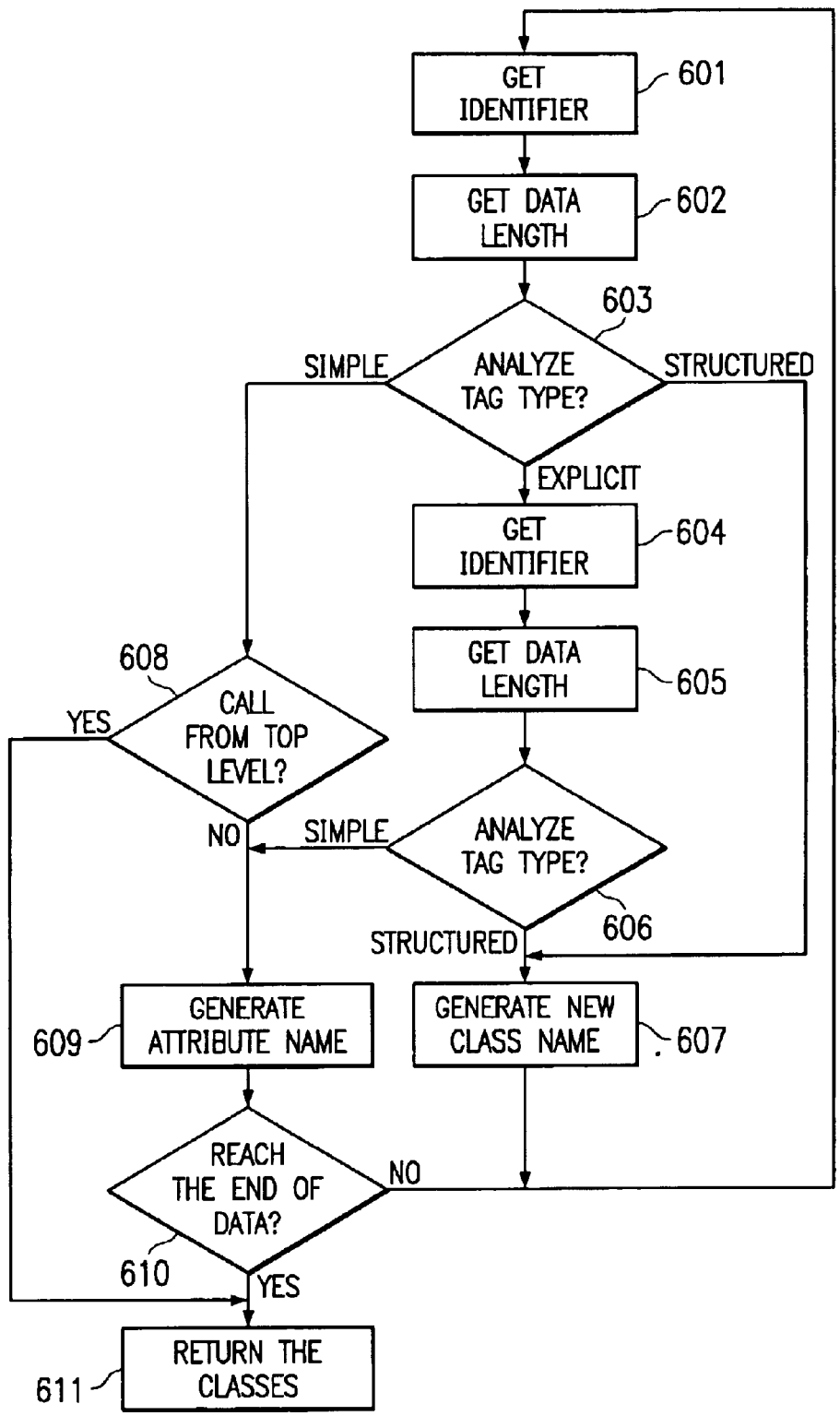
FIG. 6 depicts a flowchart illustrating a subroutine for parsing data in accordance with the present invention.

Referring now to FIG. 6, a flowchart illustrating a subroutine for parsing data is depicted in accordance with the present invention. Step 601 to "get identifier" and step 602 to "get data length" are the same as described in reference to FIG. 5. The next step is to analyze the tag type (step 603).

If the tag type is simple, the subroutine then determines if the call is from main routine (step 608). If the call is from the main routine, the tag number is recorded for further reference (classes with same tag number are the same classes), and the class is simply return to main routine (step 611). If the call is not from the main routine, a new attribute name is created, the data value is recorded, and the attribute is associated with its class (step 609). For convenience, the attribute could be named "attributeA." If the end of the data has been reached (step 610), it is returned to the main routine (step 611). If the end of the data has not been reached, the subroutine returns to step 601.

If the tag analyzed in step 603 is structured, a new class name is generated (step 607), and the subroutine returns to step 601 so that it can further parse the data content within the structured type. The subroutine could be recursively called in order to parse all the data contents nested within structure types Structured types consist of components. Examples of structured types are SEQUENCE, SEQUENCE OF, etc. SEQUENCE consists of one or more different types. SEQUENCE OF consists of one or more of a given type.

If the tag type analyzed in step 603 is explicit, it will go through "get identifier" (step 604) and "get data length" (step 605), similar to steps 601 and 602. Explicitly tagged type is derived from a simple type or structured type by putting a tag on the underlying type. Therefore, the explicitly tagged type is analyzed to determine the underlying tag type (step 606).

If the underlying tag type is structured, a new class name is generated (step 607) and the subroutine is called again to parse data content within this structured type (return to step 601). If the underlying tag type is simple, a new attribute name is generated following the convenient naming (step 609).

If the end of encoding data has been reached, the created classes are returned to the main routine (step 611). If the end of the encoding data has not been reached, the process returns to the start of the subroutine (step 601) to further parse the rest of the data.

For text input, a string parser and syntax checker are associated underneath. They perform recursive checking on the data structure. For binary input, a byte analyzer is associated underneath, which analyzes the bytes and identifies class, tag number, data length, and contents in the byte stream.

Referring to FIG. 8, an object diagram illustrating a parsing routine's execution order is depicted in accordance with the present invention. This chart is an example showing how a class diagram is generated from an encoding data stream.

The sequence of creating classes while parsing data is as follows:
a. Start creation of CLASS (the class name is created);
b. Start creation of component class 1 (class name is created);
c. Start and complete construction of subcomponent class 1 (create class name, identify attributes and associated values, record the tag number if it is explicitly tagged type);
d. Start and complete construction of subcomponent class 2 (create class name, identify attributes and their associated values, record the tag number if it is explicitly tagged type); and
e. Complete construction of component class 1. (Identify the construction mechanism of component class 1. If subcomponent classes 1 and 2 are identical, construction mechanism is repetition. Component class 1 has two attributes with types as "subcomponent class 1" and "subcomponent class 2". Identify attributes and their associated values, record the tag number if it is explicitly tagged type).

Component class 2 and component class 3 follow the similar procedure as component class 1. Finally the construction of CLASS is completed, since all of its attributes are identified.

A source code engine is responsible for generating the "skeletal" structure of Java classes in Java source code. Appropriate encoding/decoding routines are incorporated into Java code to provide a functional class. These routines make calls to a utility that contains methods for primary data types' encoding and decoding.

ASN.1 and DER encoding are inherently complex operations. Some toolkits exist to supply basic DER classes, but they still require developers to model their ASN.1 definition and determine how to call the DER encoding/decoding routines. No tool currently exists to help developers and architects easily model ASN.1 definitions in an object oriented fashion. The present invention provides this critical function and thus allows developers and architects to focus on the problem they are trying to solve, rather than the mechanics.

The present invention decreases the time and expense associated with analysis, implementing, and testing code in a heterogeneous environment, allowing software developers to focus more on business model and architecture development. The present invention also helps developers and architects analyze the data models in current architectures and enhance the design based on the object representation. Another advantage is to help testers and network administrators analyze the data transferred on the network by dynamically building object models based on the data input stream and displaying it in a graphical user interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for mapping ASN.1 data to an object model, comprising:
identifying objects in an encoded data stream, wherein the encoded data stream includes ASN.1 data;
identifying relationships between the objects; and
generating an object model based on the identified objects and the relationships between the objects, wherein identifying objects in the encoded data stream includes:
parsing the ASN.1 data to locate a data identifier, wherein the data identifier identifies a tag type for a portion of the encoded data stream;
using the data identifier to determine the tag type; and
generating source code for the portion of the encoded data stream based on the tag type.

2. The method according to claim 1, wherein the tag type is one of simple, structured and explicit.

3. The method according to claim 2, further comprising:
in response to determining the tag type as not simple, performing a parsing subroutine to further parse the remaining encoded data stream.

4. The method according to claim 3, wherein to further parse the remaining encoded data stream includes:
parsing the ASN.1 data to locate a data identifier for a portion of the remaining encoded data stream, wherein the data identifier identifies a tag type for the portion of the remaining encoded data stream; and
using the data identifier to determine the tag type.

5. The method according to claim 4, further comprising:
in response to determining the tag type as simple, determining if the call to the parsing subroutine is from a main routine;
if the call is from the main routine, recording a data tag number for further reference and returning the source code to the main routine; and
if the call is not from the main routine, generating an attribute name for the portion of the remaining encoded data stream, associating the attribute name with the source code and returning the source code with the associated attribute name to the main routine if the end of the portion of the remaining encoded data stream has been reached.

6. The method according to claim 5, further comprising recalling the parsing subroutine if the end of the remaining encoded data stream has not been reached.

7. The method according to claim 4, further comprising:
in response to determining the tag type as structured, generating a new class name for the portion of the remaining encoded data stream; and
recalling the parsing subroutine to further parse the portion of the remaining encoded data stream.

8. The method according to claim 4, further comprising:

in response to determining the tag type as explicit, further parsing the ASN.1 data to get a data identifier, wherein the data identifier identifies a tag type for the portion of the remaining encoded data stream;

using the data identifier to determine an explicit tag type; and using the explicit tag type to determine the underlying tag type, wherein the underlying tag type includes one of simple and structured.

9. The method according to claim 8, further comprising:

in response to determining the underlying tag type as simple, generating an attribute name for the portion of the remaining encoded data stream, associating the attribute name with the source code; and returning the source code with the associated attribute name to the main routine if the end of the remaining encoded data stream has been reached.

10. The method according to claim 9, further comprising recalling the parsing subroutine if the end of the remaining encoded data stream has not been reached.

11. The method according to claim 8, further comprising:

in response to determining the underlying tag type as structured, generating a new class name for the portion of the remaining encoded data stream; and recalling the parsing subroutine to further parse the portion of the remaining encoded data stream.

12. A computer program product in a computer readable medium for use in a data processing system, for mapping ASN.1 data to an object model, the computer program product comprising:

instructions for identifying objects in an encoded data stream, wherein the encoded data stream includes ASN.1 data;

instructions for identifying the relationships between the objects; and instructions for generating an object model based on the identified objects and the relationships between the objects, wherein the identifying objects in the encoded data stream includes:

parsing the ASN.1 data to locate a data identifier, wherein the data identifier identifies a tag type for a portion of the encoded data stream;

using the data identifier to determine the tag type; and generating source code for the portion of the encoded data stream based on the tag type.

13. The computer program product according to claim 12, wherein the tag type is one of simple, structured and explicit.

14. The computer program product according to claim 13, further comprising:

in response to determining the tag type as not simple, performing a parsing subroutine for further parsing the remaining encoded data stream.

15. The computer program product according to claim 14, wherein parsing the remaining encoded data stream includes:

instructions for parsing the ASN.1 data to locate a data identifier for a portion of the remaining encoded data stream, wherein the data identifier identifies a tag type for the portion of the remaining encoded data stream; and instructions for using the data identifier to determine the tag type.

16. The computer program product according to claim 15, further comprising:

in response to determining the tag type as simple, instructions for determining if the call to the parsing subroutine is from a main routine;

if the call is from the main routine, instructions for recording a data tag number for further reference and returning the source code to the main routine; and if the call is not from the main routine, instructions for generating an attribute name for the portion of the remaining encoded data stream, associating the attribute name with the source code and returning the source code with the associated attribute name to the main routine if the end of the portion of the remaining encoded data stream has been reached.

17. The computer program product according to claim 16, further comprising instructions for recalling the parsing subroutine if the end of the remaining encoded data stream has not been reached.

18. The computer program product according to claim 15, further comprising:

in response to determining the tag type as structured, instructions for generating a new class name for the portion of the remaining encoded data stream; and instructions for recalling the parsing subroutine to further parse the portion of the remaining encoded data stream.

19. The computer program product according to claim 15, further comprising:

in response to determining the tag type as explicit, instructions for further parsing the data content to get a data identifier; and instructions for using the explicit tag type to determine the underlying tag type, wherein the underlying tag type includes one of simple and structured.

20. The computer program product according to claim 19, further comprising:

in response to determining the underlying tag type as simple, instructions for generating an attribute name for the portion of the remaining data stream, associating the attribute name with the source code; and instructions for returning the source code with the associated attribute name to the main routine if the end of the remaining encoded data stream has been reached.

21. The computer program product according to claim 20, further comprising instructions for recalling the parsing subroutine if the end of the remaining encoded data stream has not been reached.

22. The computer program product according to claim 19, further comprising:

in response to determining the underlying tag type as structured, instructions for generating a new class name for the portion of the remaining encoded data stream; and instructions for recalling the parsing subroutine to further parse the portion of the remaining encoded data stream.

23. A system for mapping ASN.1 data to an object model, comprising:

means for identifying objects in an encoded data stream, wherein the encoded data stream includes ASN.1 data;

means for identifying relationships between the objects; and means for generating an object model generating an object model based on the identified objects and the relationships between the objects, wherein means for identifying objects in the encoded data stream includes:

means for parsing the ASN.1 data to locate a data identifier, wherein the data identifier identifies a tag type for a portion of the encoded data stream;

means for using the data identifier to determine the tag type; and means for generating source code for the portion of the encoded data stream based on the tag type.

* * * * *